(12) United States Patent
Kim

(10) Patent No.: US 6,936,944 B2
(45) Date of Patent: Aug. 30, 2005

(54) SPINDLE MOTOR FOR HARD DISK DRIVES

(75) Inventor: Sang Uk Kim, Seoul (KR)

(73) Assignee: G & W Technologies Inc. (KR)

( * ) Notice: Subject to any disclaimer, the term of this patent is extended or adjusted under 35 U.S.C. 154(b) by 0 days.

(21) Appl. No.: 10/497,062

(22) PCT Filed: Nov. 28, 2002

(86) PCT No.: PCT/KR02/02230
§ 371 (c)(1),
(2), (4) Date: May 27, 2004

(87) PCT Pub. No.: WO03/046911
PCT Pub. Date: Jun. 5, 2003

(65) Prior Publication Data
US 2005/0006964 A1 Jan. 13, 2005

(30) Foreign Application Priority Data
Nov. 29, 2001 (KR) .................... 10-2001/74912

(51) Int. Cl.$^7$ ............ H02K 5/16; H02K 7/06; G11B 17/00; F16C 7/00
(52) U.S. Cl. ............ 310/90; 310/67 R; 360/99.08
(58) Field of Search ............ 310/67 R, 90, 310/91; 360/98.07, 99.04, 99.08, 99.09, 99.05, 99.12; 384/100, 107, 119, 124, 123

(56) References Cited

U.S. PATENT DOCUMENTS 4,200,344 A * 4/1980 Binns et al. ............ 384/107
5,880,545 A * 3/1999 Takemura et al. ............ 310/90
6,583,952 B1 * 6/2003 Grantz et al. ............ 360/99.08

FOREIGN PATENT DOCUMENTS

| JP | 08-212686 | 8/1996 |
| JP | 2000-324777 | 11/2000 |

* cited by examiner

Primary Examiner—Tran Nguyen
(74) Attorney, Agent, or Firm—Keusey, Tutunjian & Bitetto, P.C.

(57) ABSTRACT

Disclosed is a spindle motor for hard disk drives capable of generating mechanical and electrical preloads to form a predetermined sized air gap through use of mechanical and electrical offsets, so that the spindle motor is prevented from being damaged by friction and heat generated during an initial starting. The spindle motor with mechanical and electrical offsets is designed so that a midpoint of the vertical width of the poles wound around by a coil of a stator is placed within a magnetic field so as not to be flush with a midpoint of the vertical width of a permanent magnet fitted on the inner circumferential surface of the hub, and each of the poles has at least one of its upper and lower end extending in a vertical direction by a predetermined length to distribute magnetic flux density differently between the upper and lower ends of each pole.

11 Claims, 8 Drawing Sheets

SPINDLE MOTOR FOR HARD DISK DRIVES

FIELD OF INVENTION

The present invention relates to a spindle motor for hard disk drives. More particularly, the present invention relates to a spindle motor with an aerodynamic bearing assembly constructed to generate preload through an offset, in which a mechanical and/or electrical offset is formed between a plurality of poles of a stator and a permanent magnet, and the resulting mechanical and/or electrical preload is established together with a predetermined size of air gap between the stator and a hub disposed on the stator, thus being capable of preventing malfunction of the spindle motor caused by friction and the resulting heat generated during an initial starting.

BACKGROUND ART

Generally, a hard disk drive functions as an auxiliary memory unit of a computer, which is comprised of a platter, a head, a spindle motor, a head arm and a printed circuit board. The hard disk drive helps to operate a system of the computer either by reading out and regenerating information stored at the platter through the head or by writing new information on the platter through the head.

In the construction of the above-mentioned hard disk drive, the platter is a metallic circular plate coated with magnetic material, functioning to write various data. The platter is rotated with a plurality of rows stacked on a rotatable shaft. This rotatable shaft is named a spindle shaft. A motor for rotating the spindle shaft is named a spindle motor.

The head for reading/writing data stored at the platter is connected to the head arm so as to access desired information addresses. This head arm is driven by a head actuator, which is named a voice coil motor (VCM). A conventional spindle motor will be described below.

FIG. 1 is an exploded perspective view of a conventional spindle motor for hard disk drives employing at least one ball bearing, and FIG. 2 is a cross sectional view of the spindle motor of FIG. 1.

As shown in FIGS. 1 and 2, the conventional spindle motor 10 for hard disk drives employing at least one ball bearing comprises a base 11 formed as a lower portion of the spindle motor, a spindle shaft 12 fitted at a center of the base in a vertical direction, a first ball bearing 13 fitted on a lower portion of the spindle shaft 12 positioned on the upper side of the base 11, a stator 14 fitted around the first ball bearing 13 and constructed for a coil 14b to be wound around a core 14a, a second ball bearing 15 fitted on an upper portion of the spindle shaft 12, a hub 16 supported to be rotatable about the fist and second ball bearings 13 and 15 and constructed to cover the upper portion of the base 11, and an annular permanent magnet 17 fitted on an inner circumferential surface of a lower portion of the hub 16 and generating driving force for rotating the hub 16 through the magnetic field produced in cooperation with the coil 14b.

In the conventional spindle motor 10 for hard disk drives employing at least one ball bearing constructed as mentioned above, when power is supplied to the coil 14b of the stator 14, a magnetic field (not shown) is established between the coil 14b and the permanent magnet 17. The magnetic field between the coil 14b and the permanent magnet 17 allows the hub 16 to be rotated in one direction.

However, construction of rotating the hub 16 by use of ball bearings 13 and 15 makes it impossible to implement high-speed driving with a strict rotational precision, which results in generating noise and vibration when the ball bearing rotates at a high speed. The following description will be made regarding the construction of an aerodynamic bearing shown in FIG. 3.

FIG. 3 is a cross-sectional view of a conventional spindle motor for hard disk drives employing at least one aerodynamic bearing.

The conventional spindle motor 20 for hard disk drives employing at least one aerodynamic bearing shown in FIG. 3 includes a base 21 formed as a lower portion of the spindle motor, a first bearing 22 fined on an upper central portion of the base 21, a stator 23 fitted around the first ball bearing 22 and constructed to enable a coil 23b to be wound around a core 23a, a spindle shaft 24 fitted on an upper central portion in a vertical direction, a second bearing 25 fitted on an upper portion of the spindle shaft 24, a supported hub 26 that is rotatable about the spindle shaft 24 and constructed to cover the upper portion of the base 21, first and second aerodynamic bearings 27 and 28 fitted on an inner upper portion of the hub 26 and generating aerodynamic pressure for smoothly rotating the hub 26 about the spindle shaft 24, and a permanent magnet 27 fitted on an inner circumferential surface of a lower portion of the hub 16 and generating driving force for rotating the hub 26 through the magnetic field produced in cooperation with the coil 23b.

In the conventional spindle motor 20 for hard disk drives employing at least one aerodynamic bearing constructed as mentioned above, when power is supplied to the coil 23b of the stator 23, a magnetic field (not shown) is established between the coil 23b and the permanent magnet 27. The magnetic field between the coil 23b and the permanent magnet 27 allows the hub 26 to be rotated in one direction.

Once the hub 26 rotates, air begins to flow on the inner surfaces of the first and second aerodynamic bearings 27 and 28. The faster the hub 26 rotates, the stronger the air flows. As a result, the flow of the air is changed into a layer of air having a predetermined rigidity between the first and second aerodynamic bearings 27 and 28, the spindle shaft 24, the first bearing 25, and the second bearing 22 in proportion to the rotational speed of the hub 26. Therefore, the hub 26 with a mounted platter (not shown) rotates about the spindle shaft 24 while overcoming the imposed load and disturbance from the air layer between the spindle shaft 24 and the hub 26 acting as a bearing.

However, the conventional spindle motor for hard disk drives employing at least one aerodynamic bearing, constructed as mentioned above, enables rigidity of the air layer to be improved at a low-speed rotation, but rigidity of the air layer is maintained almost constantly without an increase in proportion to the rotational speed when the motor rotates over a fixed speed.

Further, the conventional spindle motor for hard disk drives employing at least one aerodynamic bearing constructed, as mentioned above, is designed so that the base is assembled with the first bearing but the spindle shaft is assembled with the second bearing, so that the assembled two sets maintain a predetermined size of air gap with respect to the aerodynamic bearings. Therefore, there are problems in that the spindle motor has a reduced assembly capability and has a difficulty in constantly maintaining a constant thickness of the air gap. Moreover, the spindle motor is designed so that the hub is supported around the spindle shaft via the air gap without putting the hub into direct contact with the spindle shaft Therefore, during an initial starting, the spindle motor is subjected to malfunction, attrition losses of the aerodynamic bearings as well as the first and second bearings, noise and vibration, all of which are caused by friction.

SUMMARY OF THE INVENTION

Therefore, the present invention has been made in view of the above-mentioned problems, and it is an object of the present invention to provide a spindle motor for hard disk drives, capable of defining a predetermined size of air gap between the hub and the aerodynamic bearing assembly by mechanical preload generated from a mechanical offset between a core of the stator and the permanent magnet, whereby the spindle motor is prevented from being damaged by friction and the resulting heat generated during an initial starting.

It is another object of the present invention to provide a spindle motor for hard disk drives, capable of defining a predetermined size of air gap between the hub and the aerodynamic bearing assembly by an electrical offset which generates electrical preload between the hub and the aerodynamic bearing assembly by generating static torque during an initial driving when aerodynamic pressure is not generated, whereby the spindle motor is prevented from being damaged by friction and heat generated during an initial starting.

It is yet another object of the present invention to provide a spindle motor for hard disk drives, capable of defining a predetermined size of air gap between the hub and the aerodynamic bearing assembly by mechanical and electrical preloads generated by mechanical and electrical offsets, whereby the spindle motor has improved safety because it is prevented from being damaged by friction and heat.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Figure 1:
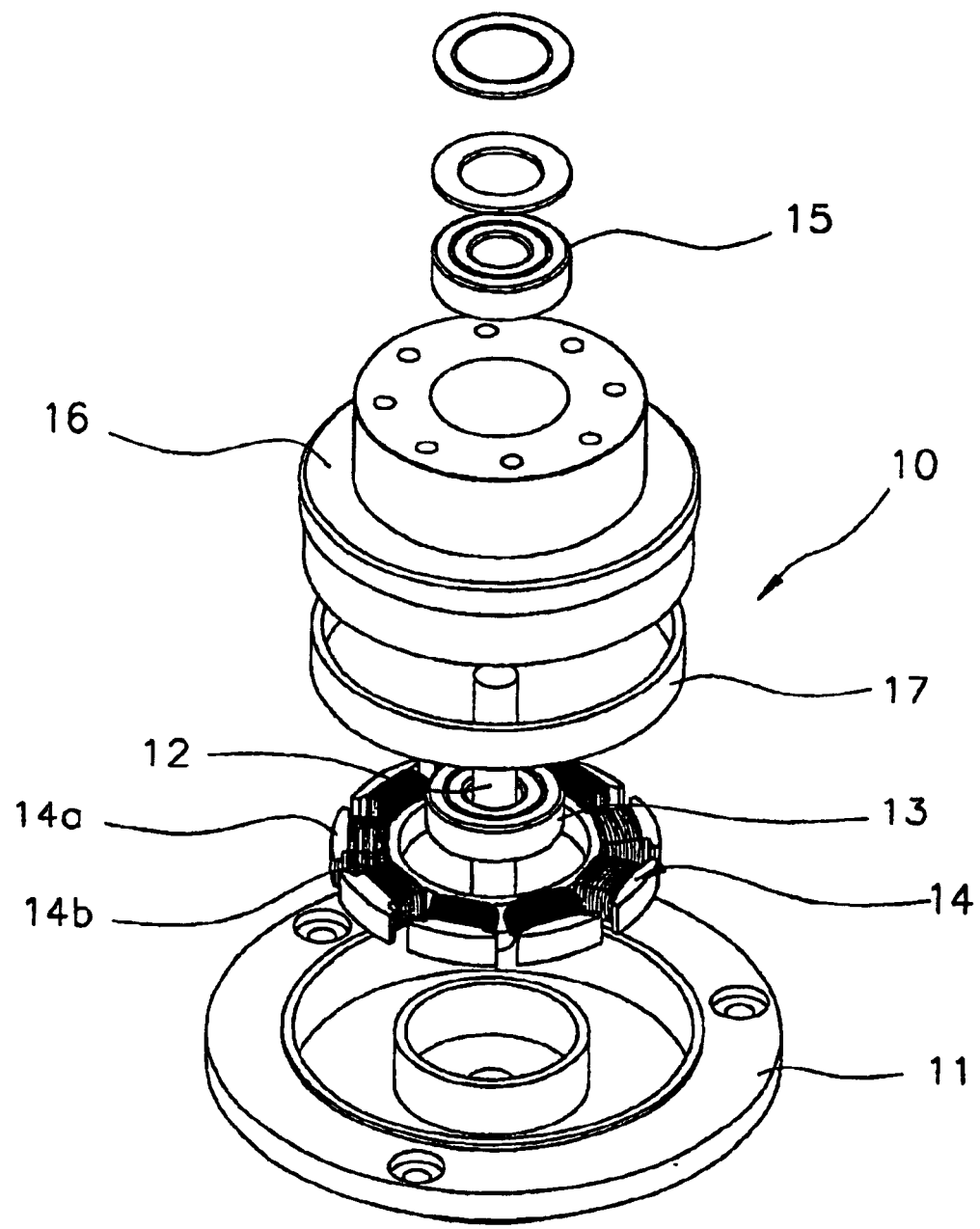
FIG. 1 is an exploded perspective view of a conventional spindle motor for hard disk drives employing at least one ball bearing.
Figure 2:
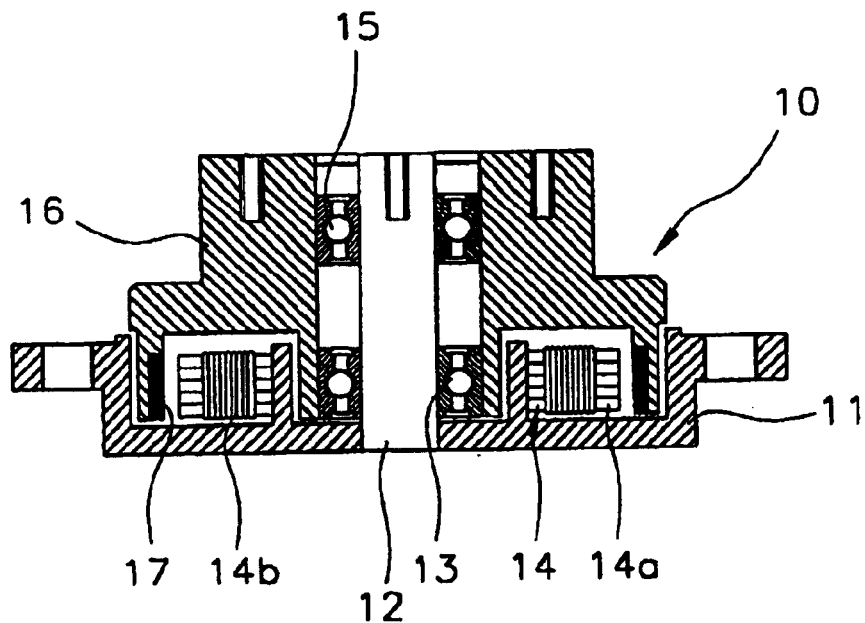
FIG. 2 is a cross sectional view of the spindle motor of FIG. 1.
Figure 3:
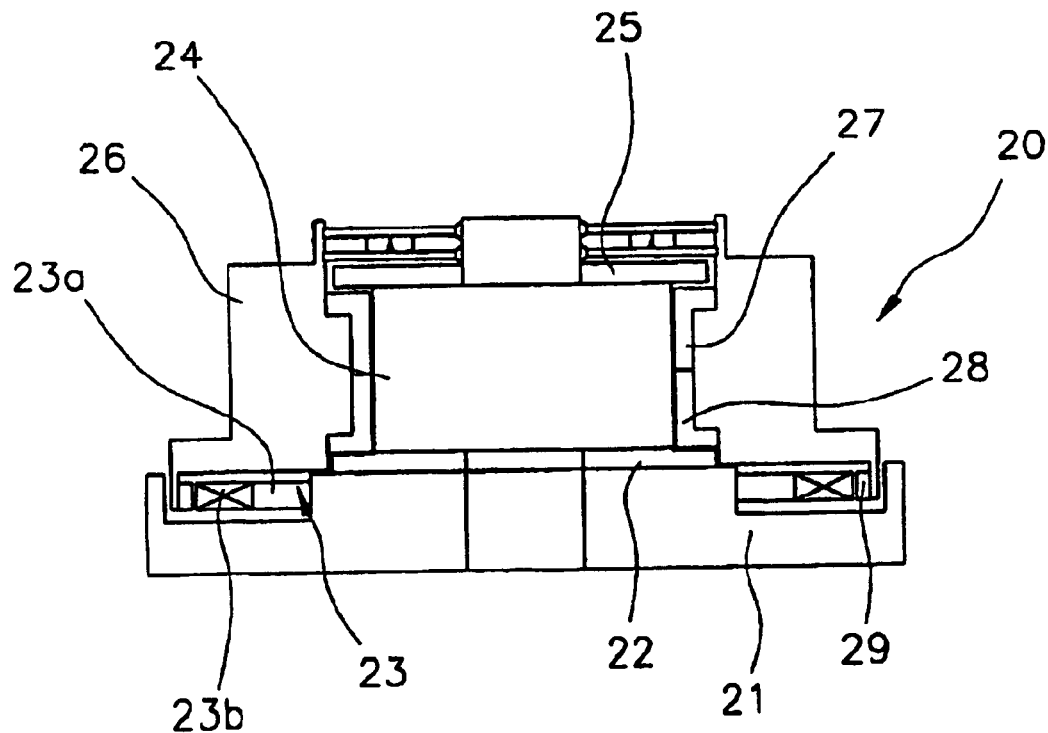
FIG. 3 is a cross-sectional view of a conventional spindle motor for hard disk drives employing at least one aerodynamic bearing.

In order to accomplish these objects, a spindle motor for hard disk drives according to the present invention comprises: a base formed as a lower portion of the spindle motor, a hub, rotatably fitted on the base, for fixedly mounting a platter; a stator designed so that a coil is wound around a plurality of poles, the poles being radially formed along an outer circumference of a core, the core being formed with an open press-fit portion; an aerodynamic bearing assembly comprising a main bearing body establishing aerodynamic pressure in cooperation with the hub and an auxiliary bearing body firmly supported in the open press-fit portion of the stator; and a permanent magnet, fitted on an inner circumferential surface of the hub, for generating magnetic field in cooperation with the coil, wherein a midpoint of the vertical width of the poles wound around by the coil of the stator is placed within magnetic field not to be flush with a midpoint of the vertical width of the permanent magnet fitted on the inner circumferential surface of the hub so as to form a mechanical offset between the poles and the permanent magnet, whereby when power is not supplied, the magnetic force in both the radial and thrust directions, which is generated between the poles and the permanent magnet between which the mechanical offset is formed, causes a mechanical preload to be established between the hub and the aerodynamic bearing assembly so that an air gap is maintained between the hub and the aerodynamic bearing assembly.

In the above-mentioned construction, the mechanical offset is formed to place the midpoint of the vertical width of the permanent magnet of the hub at a higher position than that of the poles of the stator, or the mechanical offset is formed to place the midpoint of the vertical width of the permanent magnet of the hub at a lower position than that of the poles of the stator.

The present invention can also be implemented as a spindle motor for hard disk drives, comprising: a base formed as a lower portion of the spindle motor; a hub, rotatably fitted on the base, for fixedly mounting a platter; a stator designed so that a coil can be wound around a plurality of poles, the poles being radially formed along an outer circumference of a core, the core being provided with an open press-fit portion; an aerodynamic bearing assembly comprising a main bearing body establishing aerodynamic pressure in cooperation with the hub and an auxiliary bearing body firmly supported in the open press-fit portion of the stator; and a permanent magnet, fitted on an inner circumferential surface of the hub, for generating a magnetic field in cooperation with the coil, wherein a midpoint of the vertical width of the poles wound around by the coil of the stator is placed to be flush with a midpoint of the vertical width of the permanent magnet fitted on the inner circumferential surface of the hub, but at the same time, each of the poles has at least one upper or lower end extending in a vertical direction by a predetermined length so as to form an electrical offset between the poles and the permanent magnet in order to distribute magnetic flux density differently between the upper and lower ends of each pole, whereby when power is supplied, the electrical offset, which shifts the midpoint of the vertical width of the permanent magnet toward a position where the magnetic flux density has the maximum value, causes electrical preload to be established between the hub and the aerodynamic bearing assembly so that an air gap is maintained between the hub and the aerodynamic bearing assembly.

In the above-mentioned construction, each of the poles has a longer upper end than lower end so that the lower end has a higher magnetic flux density than the upper end, or each of the poles has a longer lower end than upper end so that the upper end has higher magnetic flux density than the lower end.

The present invention can be yet implemented as a spindle motor for hard disk drives, comprising: a base formed as a lower portion of the spindle motor, a hub, rotatably fitted on the base, for fixedly mounting a platter; a stator designed so that a coil is wound around a plurality of poles, the poles being radially formed along an outer circumference of a core, the core being provided with an open press-fit portion; an aerodynamic bearing assembly comprising a main bearing body establishing aerodynamic pressure in cooperation with the hub and an auxiliary bearing body firmly supported in the open press-fit portion of the stator; and a permanent magnet, fitted on an inner circumferential surface of the hub, for generating a magnetic field in cooperation with the coil, wherein a midpoint of the vertical width of the poles, which the coil of the stator is wound around, is placed within a magnetic field in a way in which it is not flush with a midpoint of the vertical width of the permanent magnet fitted on the inner circumferential surface of the hub, thereby forming a mechanical offset between the poles and the permanent magnet. Meanwhile, each of the poles has at least one upper or lower end extending in a vertical direction by a predetermined length so as to form an electrical offset between the hub and the aerodynamic bearing assembly for distributing magnetic flux density differently between the upper and lower ends of each pole, whereby when power is not supplied, the magnetic force in both the radial and thrust directions, which is generated between the poles and the permanent magnet between which the mechanical offset is formed, causes a mechanical preload to be established between the hub and the aerodynamic bearing assembly so that an air gap is maintained between the hub and the aerodynamic bearing assembly, and whereby when power is supplied, the electrical offset, which shifts the midpoint of the vertical width of the permanent magnet toward a position where the magnetic flux density has the maximum value, causes an electrical preload to be established between the hub and the aerodynamic bearing assembly during an initial driving when aerodynamic pressure is not generated, so that the air gap is maintained between the hub and the aerodynamic bearing assembly.

In the above-mentioned construction, each of the poles has a longer lower end than upper end so that the upper end has a higher magnetic flux density than the lower end, and at the same time the midpoint of the vertical width of the permanent magnet of the hub is placed at higher position than that of the poles of the stator, whereby when power is not supplied, a mechanical preload is enacted between the hub and the aerodynamic bearing assembly resulting from the magnetic force of both radial and thrust directions, which is generated between the poles and the permanent magnet. In this state, when power is supplied, the midpoint of the vertical width of the permanent magnet is downwardly shifted toward a position where the magnetic flux density has the highest intensity.

Alternately, each of the poles has a longer lower end than upper end so that the upper end has a higher magnetic flux density than the lower end, and at the same time the midpoint of the vertical width of the permanent magnet of the hub is placed at a lower position than that of the poles of the stator, whereby when power is not supplied, a mechanical preload is enacted between the hub and the aerodynamic bearing assembly through the magnetic force in both the radial and thrust directions, which is generated between the poles and the permanent magnet, and in this state, when power is supplied, the midpoint of the vertical width of the permanent magnet is upwardly shifted toward a position where the magnetic flux density has the highest intensity.

In another alternative version, each of the poles has a longer upper end than the lower end so that the lower end has a higher magnetic flux density than the upper end, and at the same time the midpoint of the vertical width of the permanent magnet of the hub is placed at a higher position than that of the poles of the stator, whereby when power is supplied, a mechanical preload is enacted between the hub and the aerodynamic bearing assembly through the magnetic force in both the radial and thrust directions, which is generated between the poles and the permanent magnet, and in this state, when power is supplied, the midpoint of the vertical width of the permanent magnet is downwardly shifted toward a position where the magnetic flux density has the highest intensity.

In yet another alternate version, each of the poles has a longer upper end than lower end so that the lower end has a higher magnetic flux density than the upper end, and at the same time the midpoint of the vertical width of the permanent magnet of the hub is placed at a lower position than that of the poles of the stator, whereby when power is not supplied, a mechanical preload is enacted between the hub and the aerodynamic bearing assembly through the magnetic force in both the radial and thrust directions, which is generated between the poles and the permanent magnet, and in this state, when power is supplied, the midpoint of the vertical width of the permanent magnet is upwardly shifted toward a position where the magnetic flux density has the highest intensity.

Hereinafter, the preferred embodiments of the present invention will be described in detail with reference to the drawings.

Figure 4:
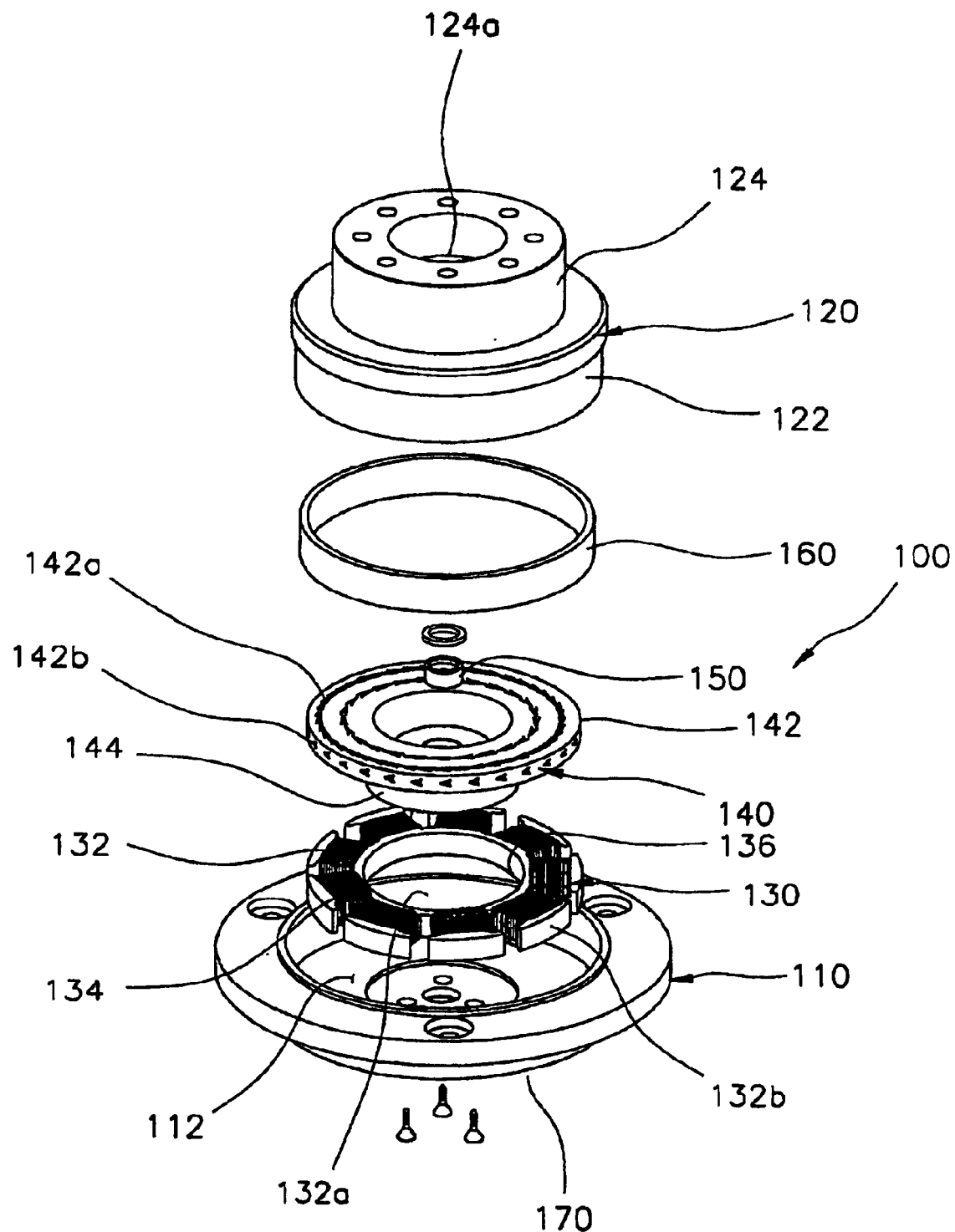
FIG. 4 is an exploded perspective view of a spindle motor for hard disk drives with a pivot structure according to the present invention.
Figure 5:
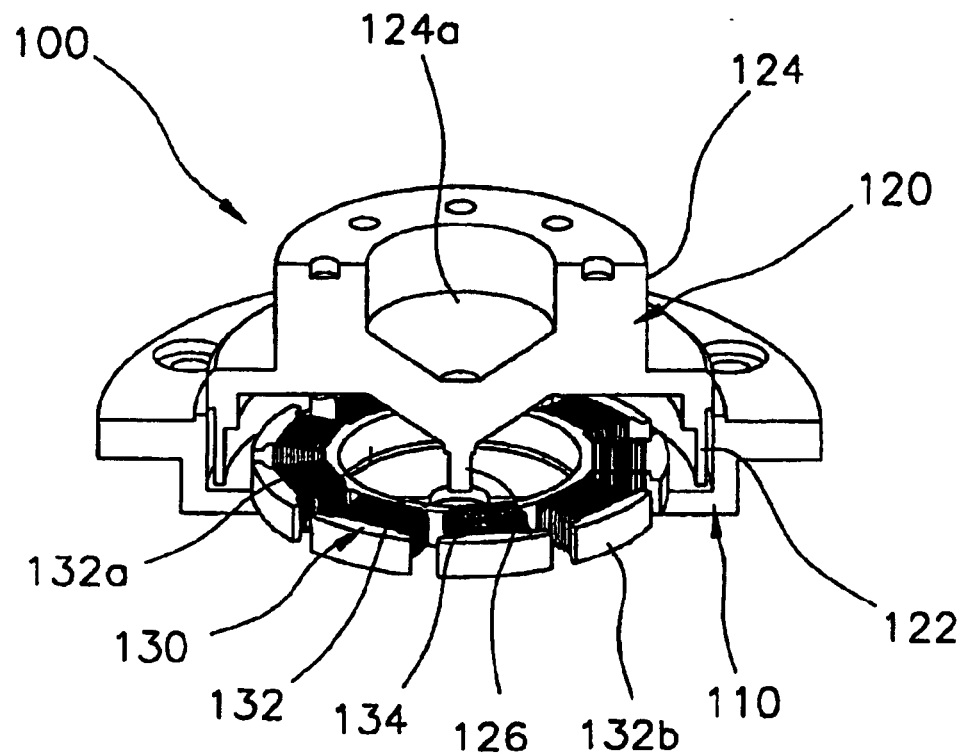
FIG. 5 is a partially sectional perspective top view of a spindle motor for hard disk drives with a pivot structure according to the present invention.
Figure 6:
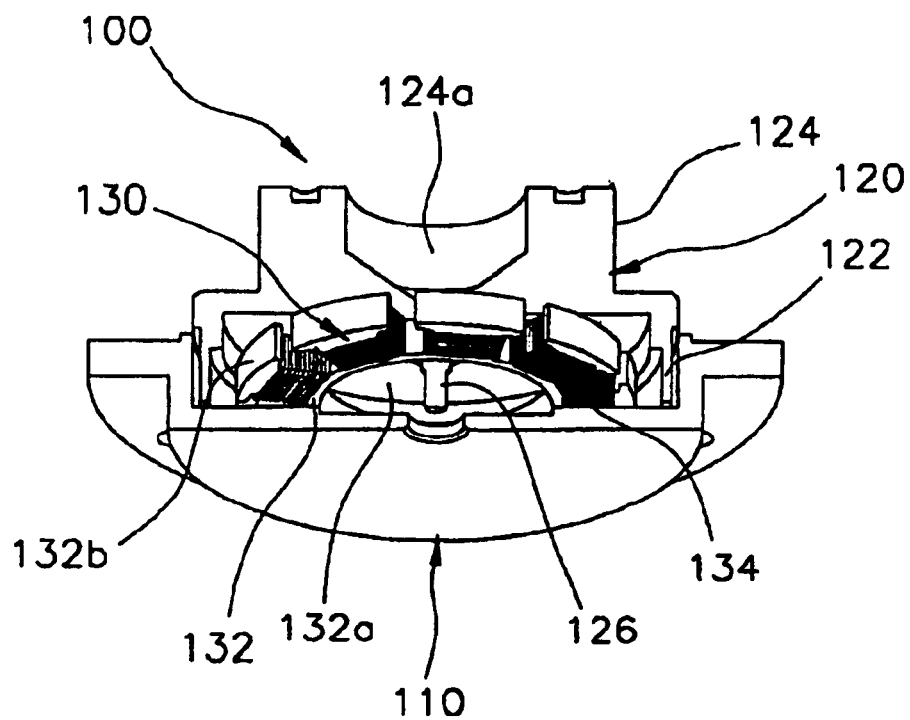
FIG. 6 is a partially sectional perspective bottom view of a spindle motor for hard disk drives with a pivot structure according to the present invention.
Figure 7:
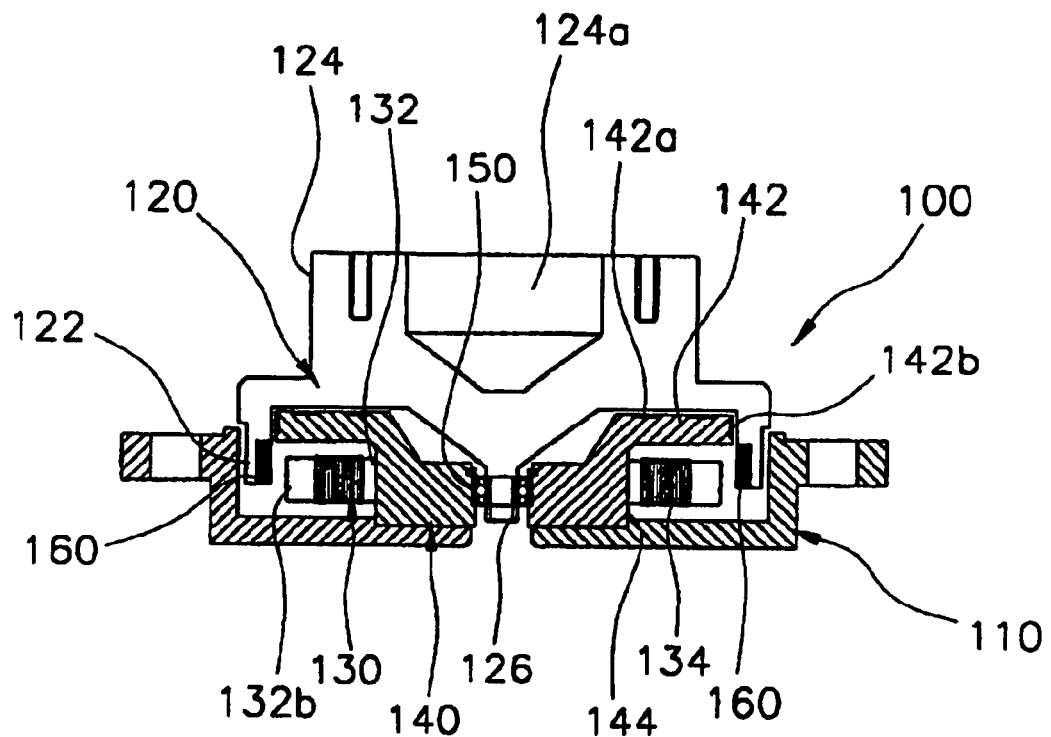
FIG. 7 is a cross-sectional view showing a mechanical offset between a stator and a permanent in a spindle motor for hard disk drives with a pivot structure according to a first embodiment of the present invention.
Figure 8:
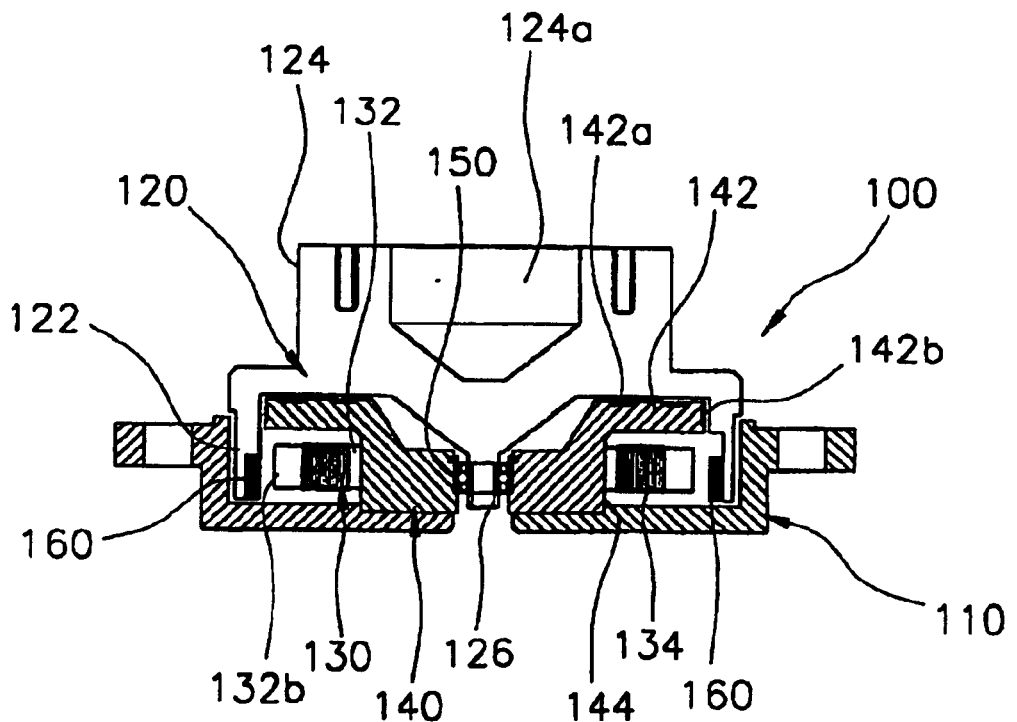
FIG. 8 is a cross-sectional view showing a mechanical offset between a stator and a permanent magnet in a spindle motor for hard disk drives with a pivot structure according to a second embodiment of the present invention.

FIG. 4 is an exploded perspective view of a spindle motor for hard disk drives with a pivot structure according to the present invention, FIG. 5 is a partial sectional perspective top view of a spindle motor for hard disk drives with a pivot structure according to the present invention, FIG. 6 is a partial sectional perspective bottom view of a spindle motor for hard disk drives with a pivot structure according to the present invention, FIG. 7 is a cross-sectional view showing a mechanical offset between a stator and a permanent in a spindle motor for hard disk drives with a pivot structure according to a first embodiment of the present invention, FIG. 8 is a cross-sectional view showing a mechanical offset between a stator and a permanent magnet in a spindle motor for hard disk drives with a pivot structure according to a second embodiment of the present invention.

As shown in FIGS. 4 to 8, a spindle motor 100 for a hard disk drive according to the present invention is designed to establish a preload between a hub 120 and an aerodynamic bearing assembly 140 by magnetic force in both radial and thrust directions by means of a mechanical offset between a plurality of poles 132b around which a coil 134 of a stator 130 is wound and by means of a permanent magnet 160 which is fitted on an inner circumferential surface of a cylindrical section 122 of the hub 120, thus enabling an air gap to be maintained between a lower surface of the hub 120 and an upper surface of the aerodynamic bearing assembly 140.

That is to say, a spindle motor 100 for hard disk drives according to the present invention is designed so that forces of attraction between the poles 132b of the stator 130 and the permanent magnet 160 are simultaneously applied in both radial and thrust directions owing to the mechanical offset between the poles 132b wound around by the coil 134 of the stator 130 and the permanent magnet 160 which is fitted on the inner circumferential surface of the cylindrical section 122 of the hub 120, so that the preload between the hub 120 and the aerodynamic bearing assembly 140 can be established. This preload between the hub 120 and the aerodynamic bearing assembly 140 allows for removing friction between the hub 120 and the aerodynamic bearing assembly 140 when the spindle motor 100 starts to operate initially.

Here, for arrangement between the poles 132b of the stator 130 and the permanent magnet 160, the midpoint of vertical width of the poles 132b around which the coil 134 of the stator 130 is wound is placed within a magnetic field in such a manner so that it is not flush with the midpoint of vertical width of the permanent magnet 160 which is fitted on the inner circumferential surface of the cylindrical section 122 of the hub 120. With this construction, even though power is not applied, a mechanical preload is established between the hub 120 and the aerodynamic bearing assembly 140 by means of the magnetic force which is formed between the poles 132b and the permanent magnet 160 in both radial and thrust directions, so that the air gap can be maintained between the hub 120 and the aerodynamic bearing assembly 140.

Meanwhile, in the construction, as mentioned above, the height difference between the poles 132b around which the coil 134 of the stator 130 is wound and the permanent magnet 160 which is fitted on the inner circumferential surface of the cylindrical section 122 of the hub 120 may be formed in such a way that either the midpoint of the vertical width of the permanent magnet 160 of the hub 120 is in a higher position than that of the poles 132b of the stator 130, as shown in FIG. 7, or that the midpoint of the vertical width of the permanent magnet 160 of the hub 120 is in a lower position than that of the poles 132b of the stator 130, as shown in FIG. 8.

The spindle motor 100 for hard disk drives according to the present invention, comprises a base 110; a hub 120 rotatably fitted on the base 110 and having a platter (not shown) mounted thereupon; a stator 130 including a plurality of poles 132b, arranged along an outer circumferential surface of a core 132 at identical intervals, and a coil 134 wound around each of the poles 132b; an aerodynamic assembly 140 that includes a disk shaped main bearing body 142, formed with air grooves 142a and 142b for generating aerodynamic pressure in cooperation with the hub 120, and an auxiliary bearing body 144, integrally formed on the lower portion of the main bearing body 142 for mounting on the base 100 through an open press-fit portion 132a of the stator 130; a ball bearing 150 for causing the rotating center of the hub 120 to be rotatably supported on the rotating center of the aerodynamic bearing assembly 140; and an annular permanent magnet 160, fitted on the inner circumferential surface of the hub 120 adjacent to the poles 132b around which the coil 134 of the stator 130 is wound, for generating driving force for rotating the hub 120 by means of a magnetic force established in cooperation with the coil 134.

The spindle motor 100 for hard disk drives according to the present invention, as mentioned above, is adapted to provide a mechanical offset causing the permanent magnet 160 of the hub 120 to be positioned higher or lower than the poles 132b of the stator 130, so that even without a supply of power, the magnetic forces between the poles 132b of the stator 130 and the permanent magnet 160 of the hub 120 concur in both radial and thrust directions at the same time, thus formning the preload between the hub 120 and the auxiliary bearing body 144 of the aerodynamic bearing assembly 140.

In the above state, when power is supplied, a magnetic field is established between the poles 132b wound by the coil 134 of the stator 130 and the permanent magnet 160. Then, the hub 120 rotates about the ball bearing 150. Here, since a preload interacts between the hub 120 and the aerodynamic bearing assembly 140, friction between the hub 120 and the aerodynamic bearing assembly 140 cannot be generated during an initial starting of the spindle motor 100.

As mentioned above, once the hub 120 rotates, air begins to flow between the hub 120 and the aerodynamic bearing assembly 140, thus forming a layer of air. Most of the load to which this air layer is subjected is thrust load in a non-contact state.

As mentioned above, the spindle motor 100 for hard disk drives according to the present invention is designed so that the hub 120 pivots in the radial and thrust directions around the ball bearing 150 in direct contact with the center of the lower side of the hub 120, thus enabling the hub 120 to be rotated on the center of rotation without mechanical contact between the hub 120 and the aerodynamic bearing assembly 140 where contact results in noise and starting failure accompanying rotation of the hub 120 during an initial starting (during a slow-speed rotation) of the spindle motor 100 in the prior art.

That is, the spindle motor 100 for hard disk drives according to the present invention is designed so that the hub 120 is supported in a point-contact manner as a whirligig on the basis of the principle of rotation of the whirligig (The faster the whirligig rotates, the more rotational inertia increases. Therefore, the whirligig rotating at a high speed tends to rotate more easily than that at a low speed. This phenomenon is derived from the law of conservation of angular momentum.), thus improving rotational rigidity of the bearing against disturbance at a high-speed rotation rather than at a low-speed rotation as well as improving performance capable of rotating without a slant. The spindle motor 100 can thus obtain a high rotation precision.

Further, the spindle motor 100 for hard disk drives according to the present invention is designed so that when the hub 120 rotates at a high speed, aerodynamic pressure is established between the aerodynamic bearing assembly 140 and the hub 120 by employing the aerodynamic bearing assembly 140 in which a main bearing body 142 is provided with mono-directional air grooves 142a and 142b, thus coping with thrust load of the hub 120 and not causing the hub 120 to be in contact with the main bearing body 142 while the hub 120 is rotating at a high speed.

As mentioned above, the spindle motor 100 for hard disk drives according to the present invention is characterized by a construction combining the aerodynamic bearing assembly 140 with the ball bearing 150 and by a construction causing the hub 120 to be supported in a point-contact manner the same as a whirligig in rotation.

Description will be made in detail below regarding construction of the spindle motor 100 for hard disk drives according to the present invention. First, as shown in FIGS. 4 to 8, the base 110 is formed as a lower portion of the spindle motor 100. The base 100 is provided with a seating recess 112, which is formed in a concentric concave shape at a predetermined depth. That is, the concentric seating recess 112 is formed on an upper portion of the base 110 at a predetermined depth.

The base 100 constructed as mentioned above is provided with the stator 130 and the aerodynamic bearing assembly 140 in a space between the seating recess 112 and a lower surface of the hub 120 rotatably fitted above the base 110. The stator 130 and the aerodynamic bearing assembly 140 will be described below.

The hub 120 rotates by means of a magnetic field established between the coil 134 of the stator 130 and the permanent magnet 160. As shown in FIGS. 4 and 8, the hub 120 includes a cylindrical section 122 formed with an open lower portion and positioned in the seating recess 112 of the base 110, and a platter mounting section 124 integrally formed on the cylindrical section 122 and mounted with a platter (not shown) called a "magnetic disk". Here, the cylindrical section 122 has a smaller outer diameter than the seating recess 112 of the base 110, while the cylindrical section 122 has a larger inner diameter than the main bearing body 142 of the aerodynamic bearing assembly 140.

The hub 120 constructed as above is fitted in such a way that the cylindrical section 122 is rotatably positioned in the seating recess 112 of the base 110, without generating mechanical contacts between an outer circumferential surface of the cylindrical section 122 and an inner circumferential surface of the seating recess 112, between a lower surface of the cylindrical section 122 and a bottom surface of the seating recess 112 and between an inner circumferential surface of the cylindrical section 122 and an outer circumferential surface of the main bearing body 142 of the aerodynamic bearing assembly 140.

Meanwhile, the hub 120 is provided with a spindle shaft 126, which downwardly extends from the lower surface of the hub 120, i.e., a lower surface of a transition between the platter mounting section and the cylindrical section 122 in a conical form. The spindle shaft 126 is inserted into the ball bearing 150. The platter mounting section 124 belonging to the upper portion of the hub 120 has a cavity 124a open in the upward direction, so as to reduce the total weight of the hub 120 as much as possible.

The stator 130 functions to generate a driving force for rotating the hub 120 through a magnetic field, which is established in cooperation with the permanent magnet 160 by a power supply. As shown in FIGS. 4 to 8, the stator 130 is fixedly mounted on the auxiliary bearing body 144 of the aerodynamic bearing assembly 140 and is arranged in the space between the seating recess 112 of the base 110 and the cylindrical section 120 of the hub 120 together with the aerodynamic bearing assembly 140.

The construction of the stator 130, as mentioned above, includes a magnetically inducible core 132 formed with a open press-fit portion 132a at the center of the core and consisting of typical steel laminates, a plurality of poles 132b integrally formed along an outer circumferential edge of the core in the same interval, and a coil 134 wound around each pole 132b and establishing a magnetic field in cooperation with the permanent magnet 160 by converting each pole 132b into an electromagnet through use of a power supply.

The stator 130 constructed, as mentioned above, is not fitted in the seating recess 112 of the base 110 by itself, but it is firmly fitted on the outer circumferential surface of the auxiliary bearing body 144 of the aerodynamic bearing assembly 140 and positioned in the space between the seating recess 112 of the base 110 and the cylindrical section 122 of the hub 120.

The aerodynamic bearing assembly 140 is arranged in the space between the base 110 and the hub 120, establishing aerodynamic pressure in cooperation with the lower surface of the hub 120 while the hub 120 rotates. As shown in FIGS. 4 to 8, the aerodynamic bearing assembly 140 includes a disk shaped main bearing body 142 formed with air grooves 142a and 142b on at least one of the upper surface and the outer circumferential surface of the main bearing body, and an auxiliary bearing body 144 integrally formed on the lower portion of the main bearing body 142 and fixed in the seating recess 112 of the base 110 through the open press-fit portion 132a of the stator 130 within the space between the base 110 and the hub 120.

The aerodynamic bearing assembly 140 is fixedly supported in the seating recess 112 of the base 110, as follows: First, the auxiliary bearing body 144 of the aerodynamic bearing assembly 140 is press-fitted into the open press-fit portion 132a of the stator 130 so as to fix the stator 130 on the outer circumferential surface of the auxiliary bearing body 144, and sequentially a bottom surface of the auxiliary bearing body 144 is seated and fixed on a bottom surface of the seating recess 112 of the base 110 in concentric arrangement with respect to each other.

The main bearing body 142 of the aerodynamic bearing assembly 140, as mentioned above, has a smaller outer diameter than an inner diameter of the cylindrical section 122 of the hub 120, so that the main bearing body 142 can be fitted without being in contact with the inner circumferential surface of the cylindrical section 122 of the hub 120. Further, the main bearing body 142 of the aerodynamic bearing assembly 140 is fitted so as not to allow an upper surface of the main bearing body 142 to come into contact with a lower surface of the hub 120.

Meanwhile, the air grooves 142a and 142b, which are formed on the main bearing body 142 of the aerodynamic bearing assembly 140, may be formed on the upper surface of the main bearing body 142 and/or on the outer circumferential surface of the main bearing body 142. Further, it is preferred that the air groove 142a is concentrically formed on the upper surface of the main bearing body 142, while the air groove 142b is monodirectionally formed on the outer circumferential surface of the main bearing body 142.

The ball bearing 150 is used to allow the spindle shaft 126 of the hub 120 to be rotatably supported at the center of the aerodynamic bearing assembly 140. As shown in FIGS. 4 to 8, the ball bearing 150 is fixedly supported in a central through-hole, which passes through the rotational center of the aerodynamic bearing assembly 140, in particular of the auxiliary bearing body 144 of the aerodynamic bearing assembly 140.

The spindle shaft 126 projected from the lower surface of the hub 120 is inserted into an inner race of the ball bearing 150. In other words, the spindle shaft 126 of the hub 120 is pivoted by the ball bearing 150, which comes into direct contact with a lower center of the hub 120, in both radial and thrust directions, so that during an initial starting (during a low-speed rotation) of the spindle motor 100, mechanical contacts resulting in a starting failure or a noise accompanied by rotation of the hub 120 are no longer generated between the hub 120 and the aerodynamic bearing assembly 140.

As mentioned above, during an initial starting (during a low-speed rotation) of the spindle motor 100, the spindle shaft 126 of the hub 120 is compensatively supported by the ball bearing 150 in both radial and thrust directions, so that mechanical contacts resulting in a starting failure or noise accompanied by rotation of the hub 120 are not generated between the hub 120 and the aerodynamic bearing assembly 140. As a result, the hub 120 is capable of rotating without deviating from its rotational center.

In contrast, during a high-speed rotation of the spindle motor 100, aerodynamic pressure, which is established between the hub 120 and the aerodynamic bearing assembly 140 through the air grooves 142a and 142b of the aerodynamic bearing assembly 140, allows most of the thrust load of the hub 120 to be supported on the aerodynamic bearing assembly 140, so that the rotational rigidity of the ball bearing 150 against external disturbance as well as the capability of the hub 120 to rotate without a slant is improved. Therefore, the spindle motor 100 is capable of maintaining a high rotational precision.

As a result, it is possible for the spindle motor 100 of the present invention to rotate at a high speed even though the ball bearing 150 is applied to the spindle motor. That is, when the hub 120 rotates at a low speed, the ball bearing 150 compensatively supports the spindle shaft 126 of the hub 120 in the radial and thrust directions so that the balling bearing 150 is subjected to radial and thrust loads from the hub 120. In contrast, when the hub 120 rotates at a high speed, the aerodynamic bearing assembly 140 supports most of the radial and thrust loads from the hub 120 so that the ball bearing 150 is subjected to thrust load from the hub 120 to a slight level, which enables the spindle motor 100 to be rotated at a high speed.

The permanent magnet 160 generates a driving force for rotating the hub 120 by means of magnetic field, which is established between the coil 134 of the stator 130 and the permanent magnet 160 by supplying power. As shown in FIGS. 4 to 8, the permanent magnet 160 is fitted on the inner circumferential surface of the hub 120 adjacent to the poles 132b, which the coil 134 of the stator 130 is wound around. Therefore, the permanent magnet 160 allows the magnetic field to be established in cooperation with the coil 134.

The permanent magnet 160 has an annular ring shape and has a size compatible with the inner diameter of the cylindrical section 122 of the hub 120. Thus, the permanent magnet 160 is fixedly fitted on the inner circumferential surface of the cylindrical section 122 of the hub 120, which faces toward the poles 132b of the stator 130.

As mentioned above, since the permanent magnet 160 is fixedly fitted on the inner circumferential surface of the cylindrical section 122 of the hub 120, the magnetic field is established between the permanent magnet 160 and the coil 134 of the stator 130 by supplying power, thus rotating the hub 120 in one direction.

In brief, the spindle motor 100 for hard disk drives according to the present invention is designed so that when the hub 120 rotates at a low speed, mechanical contacts resulting in a starting failure and a noise accompanied by the rotation of the hub 120 are no longer generated between the hub 120 and the aerodynamic bearing assembly 140 by compensatively supporting the hub 120 in both radial and thrust directions through the ball bearing 150, and when the hub 120 rotates at a high speed, most of the thrust load of the hub 120 is supported on the aerodynamic bearing assembly 140 by establishing aerodynamic pressure between the hub 120 and the aerodynamic bearing assembly 140 through the air grooves 142a and 142b of the aerodynamic bearing assembly 140. Therefore, the spindle motor 100 is capable of improving the rotational rigidity of the ball bearing 150 against external disturbance as well as the capability of the hub 120 to rotate without a slant, thereby it is possible to maintain a high rotational precision.

Therefore, it is possible for the spindle motor 100 to rotate at a high speed even though the ball bearing 150 is applied to the spindle motor. Finally, the spindle motor 100 is capable of providing an excellent rotational precision by an improved rotational rigidity of the ball bearing 150 against external disturbance as well as an improved capability of the hub 120 to rotate without a slant.

Figure 9:
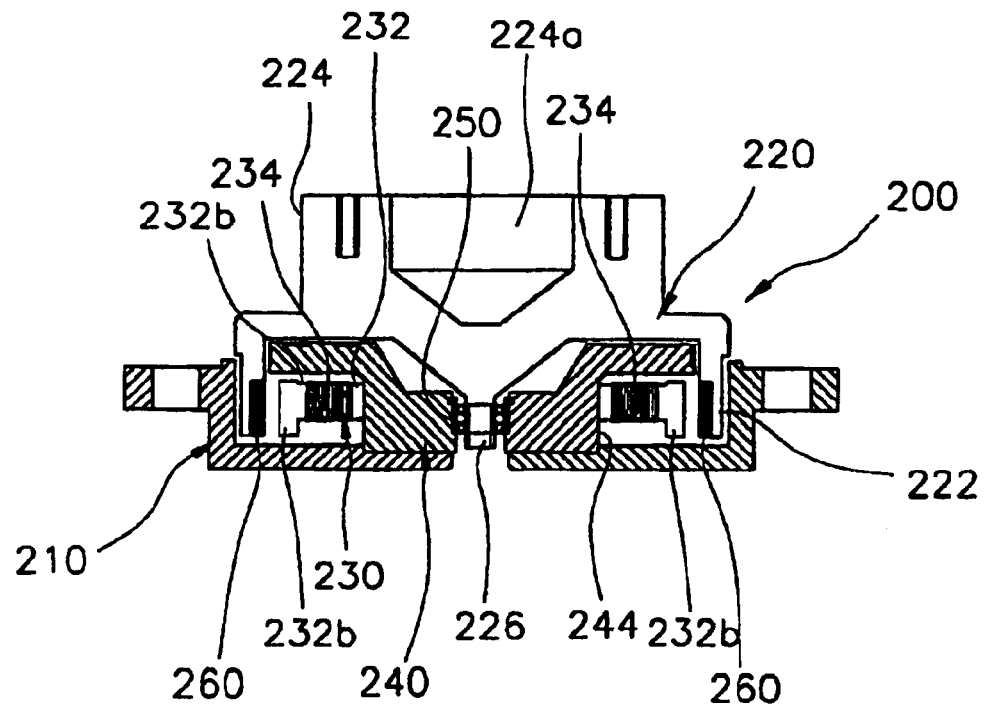
FIG. 9 is a cross-sectional view showing a electrical offset between a stator and a permanent magnet in a spindle motor for hard disk drives with a pivot structure according to a third embodiment of the present invention.
Figure 10:
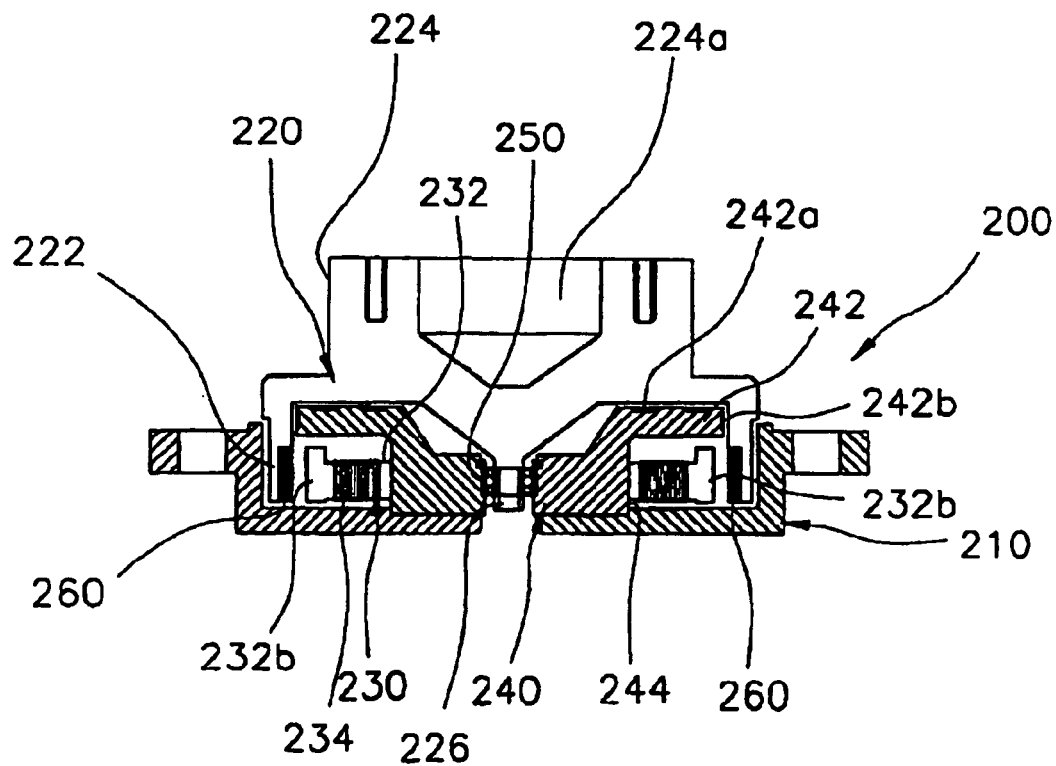
FIG. 10 is a cross-sectional view showing a electrical offset between a stator and a permanent magnet in a spindle motor for hard disk drives with a pivot structure according to a fourth embodiment of the present invention.

FIG. 9 is a cross-sectional view showing a electrical offset between a stator and a permanent magnet in a spindle motor for hard disk drives with a pivot structure according to a third embodiment of the present invention, and FIG. 10 is a cross-sectional view showing a electrical offset between a stator and a permanent magnet in a spindle motor for hard disk drives with a pivot structure according to a fourth embodiment of the present invention.

In the spindle motor 200 for hard disk drives of the present invention shown in FIGS. 9 and 10, an electrical preload is formed between a lower surface of a hub 220 and an upper surface of a cylindrical section 242 of an aerodynamic bearing assembly 240 through electrical offset between a plurality of poles 232b which are wound around by a coil 234 of the stator 230 and a permanent magnet 260 fitted on an inner circumferential surface of a hub 220, so that an air gap can be maintained between the lower surface of the hub 220 and the upper surface of the cylindrical section 242 of the aerodynamic bearing assembly 240.

According to constructions of the spindle motor 200 shown in FIGS. 9 and 10, the midpoint of the vertical width of the poles 232b is placed to be flush with the midpoint of the vertical width of the permanent magnet 260, but the poles 232b of the stator 230 extend in an upward or downward direction so as to provide protruded upper or lower ends. Due to the protruded upper or lower ends of the poles 232b, when power is supplied, magnetic flux acting on the poles 232b with protruded upper ends is distributed differently from that acting on the poles 230b with protruded lower ends. As a result, the midpoint of the vertical width of the permanent magnet 260 is moved toward a position on the poles 232b on which the magnetic flux acts to the maximal extent. Owing to this distribution difference of the magnetic flux, an electrical preload is formed between the hub 220 and the aerodynamic bearing assembly 240 so that an air gap can be maintained between the hub 220 and the aerodynamic bearing assembly 240.

Here, the electrical offset caused by a magnetic flux change in the poles 232b of the stator 230 under a supply of power on the basis of a profile change in the poles 232b of the stator 230 may cause greater magnetic flux either to be enacted on the upper ends of the poles 232b than on the lower ends of the poles 232b by additionally extending the upper ends of the poles 232b, or to be enacted on the lower ends of the poles 232b than on the upper ends of the poles 232b by additionally extending the lower ends of the poles 232b.

Owing to the electrical offset, as mentioned above, a static torque is generated during an initial driving when aerodynamic pressure is not generated, thus generating an electrical preload between the hub 220 and the aerodynamic bearing assembly 240. As a result, an air gap is formed of a predetermined size between the hub 220 and the aerodynamic bearing assembly 240. This air gap keeps the system or the spindle motor from being damaged by friction and the resulting heat, which are generated during an initial starting, so that the system has an improved safety.

According to the present invention, as shown in FIGS. 7 and 8, the mechanical offset is provided between the stator 130 and the permanent magnet 160 so that even though power is not supplied from the exterior, magnetic forces interacting between the stator 130 and the permanent magnet 160 in both radial and thrust directions cause a predetermined magnitude of preload to be generated between the hub 120 and the aerodynamic bearing assembly 140. Therefore, no friction is generated between the hub 120 and the aerodynamic bearing assembly 140 in spite of external impact.

As shown in FIGS. 9 and 10, electrical offset is provided between the stator 230 and the permanent magnet 260 so that when power is supplied, a magnetic flux difference is generated between the stator 230 and the permanent magnet 260. This magnetic flux difference causes magnetic force to be acted in both radial and thrust directions. The magnetic force allows a predetermined magnitude of preload to be generated between the hub 220 and the aerodynamic bearing assembly 240. The preload allows a predetermined size of air gap to be defined between the hub 220 and the aerodynamic bearing assembly 240, so that the air gap keeps the system from being damaged by friction and the resulting heat, which are generated during an initial starting. Therefore, the system has improved safety. In conclusion, the electrical offset causes static torque to be generated during an initial driving when aerodynamic pressure is not generated so that the electrical preload is generated between the hub 220 and the aerodynamic bearing assembly 240, which results in keeping a system or the spindle motor from being damaged by initial friction and the resulting heat.

As seen from the above, it is natural that the mechanical offset and the electrical offset, which are constructed to generate the preload, are simultaneously applied to the spindle motor. The following description will be made with regards to applying the mechanical offset and the electrical offset to the spindle motor at the same time.

Figure 11:
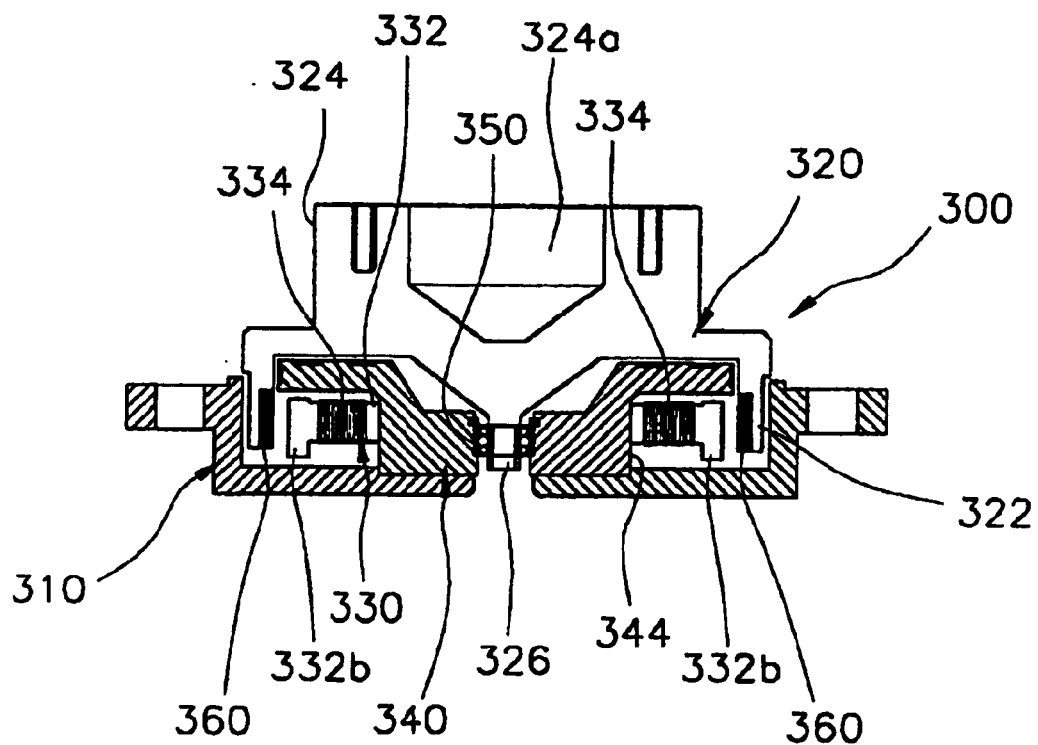
FIG. 11 is a cross-sectional view showing mechanical and electrical offsets between a stator and a permanent magnet in a spindle motor for hard disk drives with a pivot structure according to a fifth embodiment of the present invention.
Figure 12:
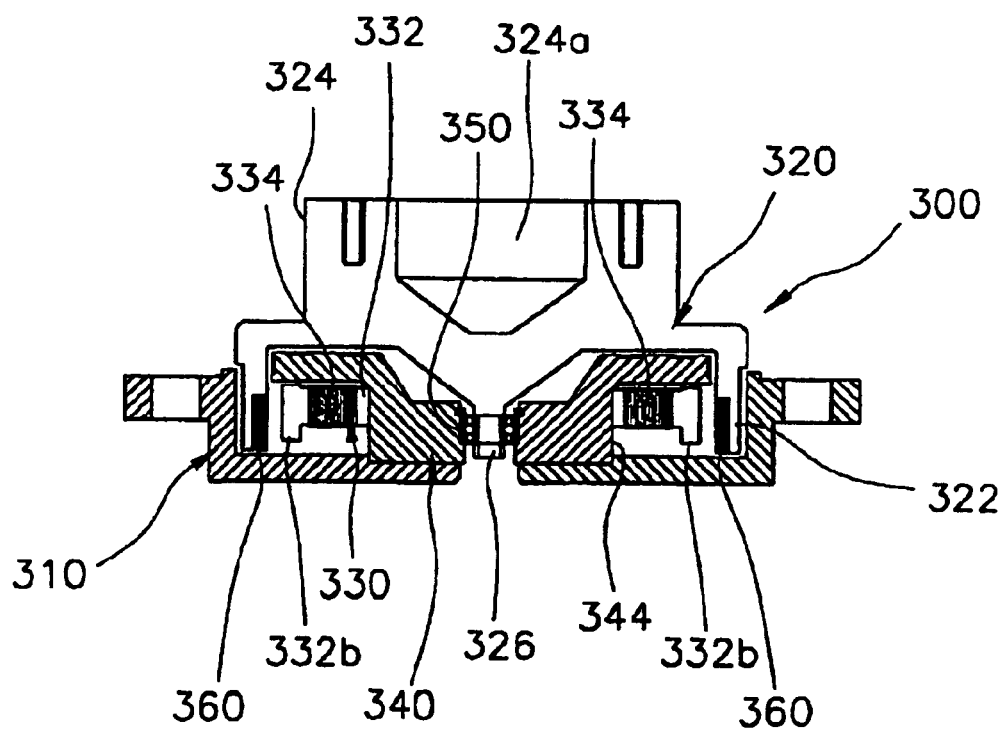
FIG. 12 is a cross-sectional view showing mechanical and electrical offsets between a stator and a permanent magnet in a spindle motor for hard disk drives with a pivot structure according to a sixth embodiment of the present invention.
Figure 13:
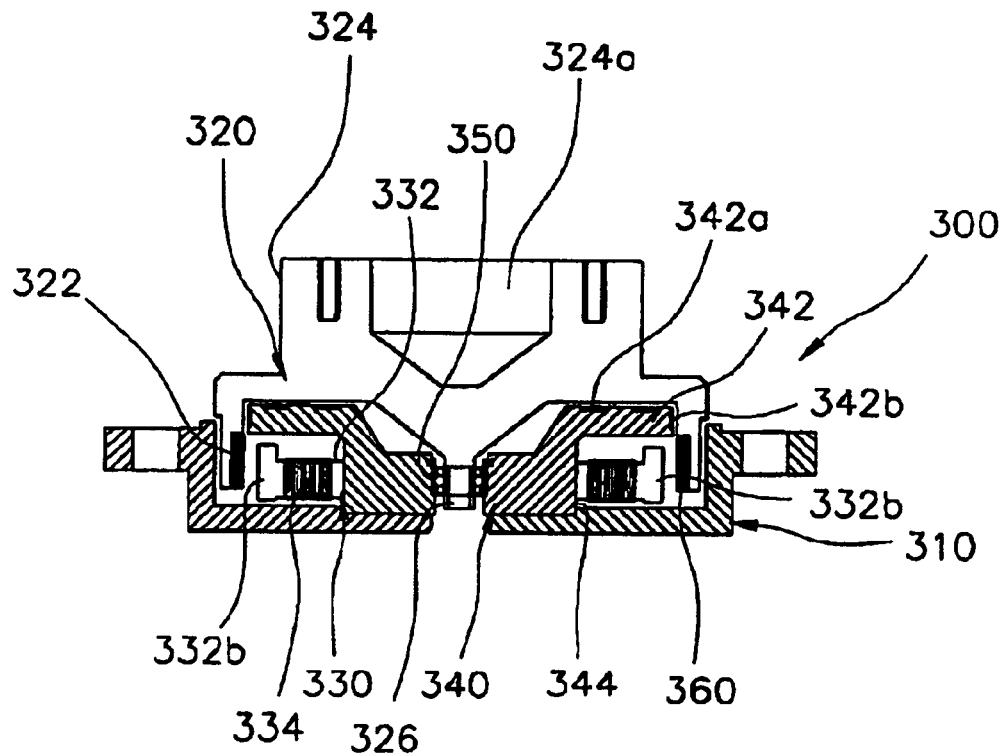
FIG. 13 is a cross-sectional view showing mechanical and electrical offsets between a stator and a permanent magnet in a spindle motor for hard disk drives with a pivot structure according to a seventh embodiment of the present invention.
Figure 14:
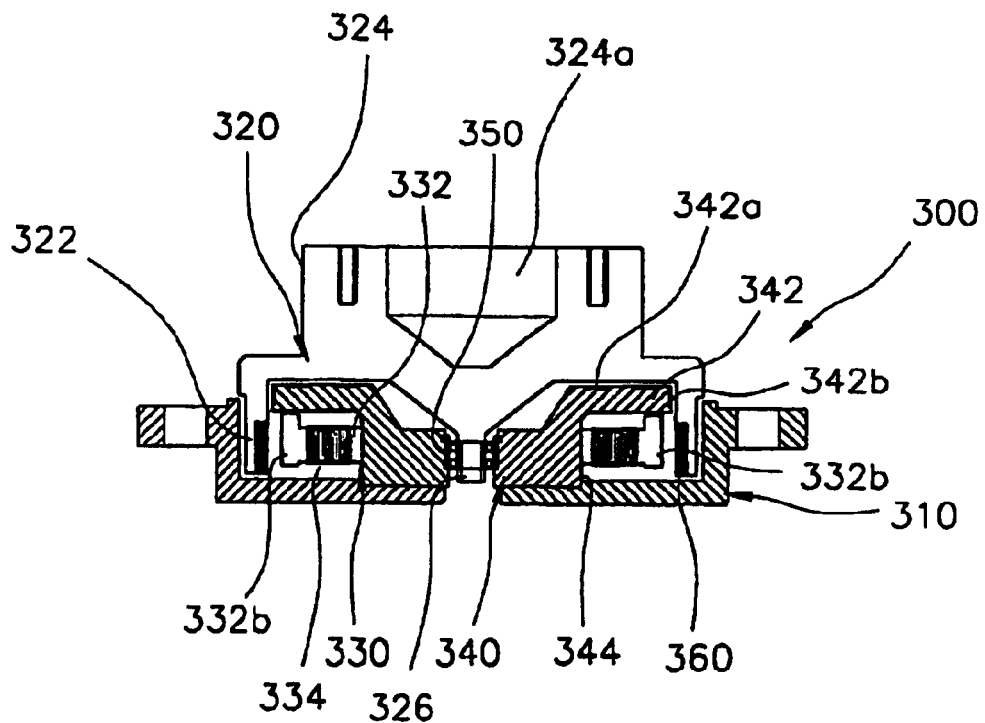
FIG. 14 is a cross-sectional view showing mechanical and electrical offsets between a stator and a permanent magnet in a spindle motor for hard disk drives with a pivot structure according to an eighth embodiment of the present invention.

FIG. 11 is a cross-sectional view showing mechanical and electrical offsets between a stator and a permanent magnet in a spindle motor for hard disk drives with a pivot structure according to a fifth embodiment of the present invention, FIG. 12 is a cross-sectional view showing mechanical and electrical offsets between a stator and a permanent magnet in a spindle motor for hard disk drives with a pivot structure according to a sixth embodiment of the present invention, FIG. 13 is a cross-sectional view showing mechanical and electrical offsets between a stator and a permanent magnet in a spindle motor for hard disk drives with a pivot structure according to a seventh embodiment of the present invention, and FIG. 14 is a cross-sectional view showing mechanical and electrical offsets between a stator and a permanent magnet in a spindle motor for hard disk drives with a pivot structure according to an eighth embodiment of the present invention.

A spindle motor 300 with a construction employing both the mechanical offset and the electrical offset in accordance with the present invention as shown in FIGS. 11 and 14, is designed so that the mechanical offset is formed by causing a midpoint of the vertical width of poles 332b wound around by a coil 304 of a stator 330 to be placed out of line with the midpoint of the vertical width of a permanent magnet 360 fitted on an inner circumferential surface of a hub 320, within the range of magnetic force, so that the electrical offset is formed by causing an intensity of magnetic flux acting on the poles 332b of the stator 330 extending in any one of upward and downward directions to be changed when power is supplied.

In the spindle motor 300 employing both the mechanical offset and the electrical offset, constructed as mentioned above, when power is not supplied, magnetic forces in both radial and thrust directions, established between the poles 332b and the permanent magnet 360 between which the mechanical offset is formed, allows mechanical preload to be enacted between the hub 320 and the aerodynamic bearing assembly 340, so that the mechanical preload enables the air gap to be maintained between the hub 320 and the aerodynamic bearing assembly 340. In contrast, when power is supplied, the electrical offset, which causes the midpoint of the vertical width of the permanent magnet 360 to be shifted toward a position where the magnetic flux intensity of the poles 332b has the maximum value, allows an electrical preload to be enacted between the hub 320 and the aerodynamic bearing assembly 340 during an initial driving when aerodynamic pressure is not generated, so that the electrical preload enables the air gap to be maintained between the hub 320 and the aerodynamic bearing assembly 340.

Hereinafter, the spindle motor 300 employing both the mechanical offset and the electrical offset will be described regarding its construction. First, in the construction shown in FIG. 11, the poles 332b of the stator 330 have lower ends protruding in the downward direction. Therefore, the upper ends of the poles 332b are adapted to have a higher magnetic flux density than the lower ends. Further, the midpoint of the vertical width of the permanent magnet 360 is adapted to be placed at a higher position than the midpoint of the vertical width of the poles 332b.

In the spindle motor 300 employing both the mechanical offset and the electrical offset as mentioned above, when power is not supplied, a mechanical preload is enacted between the hub 320 and the aerodynamic bearing assembly 340 through magnetic force in both radial and thrust directions established between the poles 332b and the permanent magnet 360. In this state, a supply of power causes the midpoint of the vertical width of the permanent magnet 360 to be downwardly shifted toward a position where the magnetic flux density of the poles 332b has the maximum value.

In the construction shown in FIG. 12, the poles 332b of the stator 330 have lower ends protruding in the downward direction. Therefore, the upper ends of the poles 332b are adapted to have a higher magnetic flux density than the lower ends. Further, the midpoint of the vertical width of the permanent magnet 360 is adapted to be placed at a lower position than the midpoint of the vertical width of the poles 332b.

In the spindle motor 300 employing both the mechanical offset and the electrical offset as mentioned above, when power is not supplied, a mechanical preload is enacted between the hub 320 and the aerodynamic bearing assembly 340 through magnetic force in both radial and thrust directions established between the poles 332b and the permanent magnet 360. In this state, a supply of power causes the midpoint of the vertical width of the permanent magnet 360 to be upwardly shifted toward a position where the magnetic flux intensity of the pole 332b has the maximum value.

In the construction employing both the mechanical offset and the electrical offset as shown in FIG. 13, the poles 332b of the stator 330 have upper ends protruding in the upward direction. Therefore, the lower ends of the poles 332b are adapted to have a higher magnetic flux density than the upper ends. Further, the midpoint of the vertical width of the permanent magnet 360 is adapted to be placed at a higher position than the midpoint of the vertical width of the poles 332b.

In the spindle motor 300 employing both the mechanical offset and the electrical offset as mentioned above, when power is not supplied, a mechanical preload is enacted between the hub 320 and the aerodynamic bearing assembly 340 through magnetic force in both radial and thrust directions established between the poles 332b and the permanent magnet 360. In this state, a supply of power causes the midpoint of the vertical width of the permanent magnet 360 to be downwardly shifted toward a position where the magnetic flux intensity of the pole 332b has the maximum value.

In the construction employing both the mechanical offset and the electrical offset as shown in FIG. 14, the poles 332b of the stator 330 have upper ends protruding in the upward direction. Therefore, the lower ends of the poles 332b are adapted to have higher magnetic flux density than the upper ends. Further, the midpoint of the vertical width of the permanent magnet 360 is adapted to be placed at a lower position than that of the poles 332b.

In the spindle motor 300 employing both the mechanical offset and the electrical offset as mentioned above, when power is not supplied, a mechanical preload is enacted between the hub 320 and the aerodynamic bearing assembly 340 through magnetic force in both radial and thrust directions established between the poles 332b and the permanent magnet 360. In this state, a supply of power causes the midpoint of the vertical width of the permanent magnet 360 to be upwardly shifted toward a position where the magnetic flux intensity of the pole 332b has the maximum value.

In conclusion, with the construction employing both the mechanical offset and the electrical offset, when power is not supplied, mechanical offset makes it possible to generate preload between the hub 320 and the aerodynamic bearing assembly 340, so that the preload allows a predetermined size of air gap to be defined between the hub 320 and the aerodynamic bearing assembly 340. In this state, when power is supplied, electrical preload is generated during an initial driving when aerodynamic pressure is not generated, so that the electrical preload makes it possible to maintain the air gap between the hub 320 and the aerodynamic bearing assembly 340. Therefore, the air gap keeps a system or the spindle motor from being damaged by friction and the resulting heat, which are generated during an initial starting.

While this invention has been described in connection with what are presently considered to be the most practical and preferred embodiments, it is to be understood that the invention is not limited to the disclosed embodiment and the drawings, but, on the contrary, it is intended to cover various modifications and variations within the spirit and scope of the appended claims.

As can be seen from the foregoing, in the spindle motor according to the present invention, preload caused by mechanical offset between a core of the stator and the permanent magnet causes the hub to be mechanically levitated so that a predetermined size of air gap can be defined between the hub and the aerodynamic bearing assembly. Therefore, this air gap keeps a system or the spindle motor from being damaged by friction and the resulting heat, which are generated during an initial starting.

Further, preload caused by static torque generated during an initial driving when aerodynamic pressure is not generated causes the hub to be electrically levitated so that a predetermined size of air gap can be defined between the hub and the aerodynamic bearing assembly. Therefore, this air gap keeps the system or the spindle motor from being damaged by friction and the resulting heat, which are generated during an initial starting.

Moreover, a preload is caused by both mechanical offset and electrical offset between the hub and the aerodynamic bearing assembly so that a predetermined size of air gap can be defined between the hub and the aerodynamic bearing assembly. Therefore, this air gap not only keeps the system or the spindle motor from being damaged by friction and the resulting heat, but also enables the system to be provided with improved safety. Even though the system makes use of only one ball bearing to support the hub, the ball bearing can cope with preload, giving the system has improved rotational precision, reduced noise and vibration, and prolonged life span.

What is claimed:

1. A spindle motor for hard disk drives, comprising:

a base formed as a lower portion of the spindle motor;

a hub, rotatably fitted on the base, for fixedly mounting a platter;

a stator constructed for a coil to be wound around a plurality of poles, the poles being radially formed along an outer circumference of a core of the stator, the core being formed with an open press-fit portion;

an aerodynamic bearing assembly comprising a main bearing body establishing aerodynamic pressure in cooperation with the hub and an auxiliary bearing body firmly supported in the open press-fit portion of the stator; and a permanent magnet, fitted on an inner circumferential surface of the hub, for generating a magnetic field in cooperation with the coil, wherein a midpoint of the vertical width of the poles wound around by the coil of the stator is placed within a magnetic field in a manner so as not to be flush with a midpoint of the vertical width of the permanent magnet fitted on the inner circumferential surface of the hub, forming a mechanical offset between the poles and the permanent magnet, thereby when power is not supplied, magnetic forces in both radial and thrust directions, which are generated between the poles and the permanent magnet between which the mechanical offset is formed, cause a mechanical preload to be established between the hub and the aerodynamic bearing assembly so that an air gap is maintained between the hub and the aerodynamic bearing assembly.

2. A spindle motor as claimed in claim 1, wherein the mechanical offset is formed in order to place the midpoint of the vertical width of the permanent magnet of the hub at a higher position than that of the poles of the stator.

3. A spindle motor as claimed in claim 1, wherein the mechanical offset is formed to place the midpoint of the vertical width of the permanent magnet of the hub at a lower position than that of the poles of the stator.

4. A spindle motor for hard disk drives, comprising:
a base formed as a lower portion of the spindle motor;
a hub, rotatably fitted on the base, for fixedly mounting a platter;
a stator constructed for a coil to be wound around a plurality of poles, the poles being radially formed along an outer circumference of a core of the stator, the core being provided with an open press-fit portion;
an aerodynamic bearing assembly comprising a main bearing body establishing aerodynamic pressure in cooperation with the hub and an auxiliary bearing body firmly supported in the open press-fit portion of the stator; and
a permanent magnet, fitted on an inner circumferential surface of the hub, for generating a magnetic field in cooperation with the coil,
wherein a midpoint of the vertical width of the poles wound around by the coil of the stator is placed in a manner so as to be flush with a midpoint of the vertical width of the permanent magnet fitted on the inner circumferential surface of the hub, but at the same time each of the poles has at least one of an upper and a lower end extending in a vertical direction by a predetermined length so as to form an electrical offset between the poles and the permanent magnet for distributing magnetic flux density differently between the upper and lower ends of each pole,
thereby when power is supplied, the electrical offset, which shifts the midpoint of the vertical width of the permanent magnet toward a position where the magnetic flux density has the maximum value, causes electrical preload to be established between the hub and the aerodynamic bearing assembly so that an air gap is maintained between the hub and the aerodynamic bearing assembly.

5. A spindle motor as claimed in claim 4, wherein each of the poles has a longer upper end than the lower end so that the lower end has higher magnetic flux density than the upper end.

6. A spindle motor as claimed in claim 4, wherein the lower end of each of the poles is longer than the upper end, so that the upper end has higher magnetic flux density than the lower end.

7. A spindle motor for hard disk drives, comprising:
a base formed as a lower portion of the spindle motor;
a hub, rotatably fitted on the base, for fixedly mounting a platter;
a stator constructed for a coil to be wound around a plurality of poles, the poles being radially formed along an outer circumference of a core of the stator, the core being provided with an open press-fit portion;
an aerodynamic bearing assembly comprising a main bearing body establishing aerodynamic pressure in cooperation with the hub and an auxiliary bearing body firmly supported in the open press-fit portion of the stator; and
a permanent magnet, fitted on an inner circumferential surface of the hub, for generating a magnetic field in cooperation with the coil,
wherein a midpoint of the vertical width of the poles wound around by the coil of the stator is placed within a magnetic field in a manner so as not to be flush with a midpoint of the vertical width of the permanent magnet fitted on the inner circumferential surface of the hub, forming a mechanical offset between the poles and the permanent magnet, and
wherein each of the poles has at least one of an upper and lower end extending in a vertical direction by a predetermined length so as to form an electrical offset between the hub and the aerodynamic bearing assembly for distributing magnetic flux density differently between the upper and lower ends of each pole,
thereby when power is not supplied, magnetic forces in both radial and thrust directions, which are generated between the poles and the permanent magnet between which the mechanical offset is formed, cause mechanical preload to be established between the hub and the aerodynamic bearing assembly so that an air gap is maintained between the hub and the aerodynamic bearing assembly, and
thereby when power is supplied, the electrical offset, which shifts the midpoint of the vertical width of the permanent magnet toward a position where the magnetic flux density has the maximum value, causes electrical preload to be established between the hub and the aerodynamic bearing assembly during an initial driving when aerodynamic pressure is not generated, so that the air gap is maintained between the hub and the aerodynamic bearing assembly.

8. A spindle motor as claimed in claim 7, wherein the lower end of each of the poles is longer than the upper end so that the upper end has a higher magnetic flux density than the lower end, and at the same time the midpoint of the vertical width of the permanent magnet of the hub is placed at a higher position than that of the poles of the stator, whereby when power is not supplied, mechanical preload is enacted between the hub and the aerodynamic bearing assembly through magnetic forces in both radial and thrust directions, which are generated between the poles and the permanent magnet, and in this state, when power is supplied, the midpoint of the vertical width of the permanent magnet is downwardly shifted toward a position where the magnetic flux density has the highest intensity.

9. A spindle motor as claimed in claim 7, wherein the lower end of each of the poles is longer than the upper end so that the upper end has a higher magnetic flux density than the lower end, and at the same time the midpoint of the vertical width of the permanent magnet of the hub is placed at a lower position than that of the poles of the stator, whereby when power is not supplied, a mechanical preload is enacted between the hub and the aerodynamic bearing assembly through magnetic forces of both radial and thrust directions, which are generated between the poles and the permanent magnet, and in this state, when power is supplied, the midpoint of the vertical width of the permanent magnet is upwardly shifted toward a position where the magnetic flux density has the highest intensity.

10. A spindle motor as claimed in claim 7, wherein the lower end of each of the poles is longer than the lower end so that the lower end has higher magnetic flux density than the upper end, and at the same time the midpoint of the vertical width of the permanent magnet of the hub is placed at a higher position than that of the poles of the stator, whereby when power is supplied, a mechanical preload is enacted between the hub and the aerodynamic bearing assembly through magnetic forces in both radial and thrust directions, which are generated between the poles and the permanent magnet, and in this state, when power is supplied, the midpoint of the vertical width of the permanent magnet is downwardly shifted toward a position where the magnetic flux density has the highest intensity.

11. A spindle motor as claimed in claim 7, wherein the lower end of each of the poles is longer than the lower end so that the lower end has higher magnetic flux density than the upper end, and at the same time the midpoint of the vertical width of the permanent magnet of the hub is placed at a lower position than that of the poles of the stator, whereby when power is not supplied, mechanical preload is enacted between the hub and the aerodynamic bearing assembly through magnetic forces in both radial and thrust directions, which are generated between the poles and the permanent magnet, and in this state, when power is supplied, the midpoint of the vertical width of the permanent magnet is upwardly shifted toward a position where the magnetic flux density has the highest intensity.

* * * * *